United States Patent [19]
Hayashi

[11] 3,968,978
[45] July 13, 1976

[54] AUTOMATIC SAFETY BELT APPARATUS FOR RESTRAINING THE OCCUPANT SITTING ON THE SEAT OF A VEHICLE

[75] Inventor: Yoshihiro Hayashi, Toyota, Japan

[73] Assignee: Kabushiki Kaisha Tokai Rika Denki Seisakusho, Japan

[22] Filed: Dec. 20, 1971

[21] Appl. No.: 210,033

[30] Foreign Application Priority Data
Dec. 18, 1970 Japan............................ 45-114631

[52] U.S. Cl. ............................................. 280/745
[51] Int. Cl.² ........................................ B60R 21/02
[58] Field of Search ............................. 280/150 SB

[56] References Cited
UNITED STATES PATENTS 3,583,726  6/1971  Lindblad ................. 280/150 SB
3,680,883  8/1972  Keppel ..................... 280/150 SB Primary Examiner—Robert R. Song
Attorney, Agent, or Firm—Stewart and Kolasch, Ltd.

[57] ABSTRACT

An automatic safety belt apparatus for restraining the occupant sitting on the seat of a motor vehicle, which comprises a plurality of elements which operatively cooperate so that, when the door of a vehicle is closed from an open position, the safety belt automatically position itself around both the hip and the shoulders of the occupant in a restraining manner. Upon releasing the belt member or opening the vehicle door, the safety belt apparatus operates in an opposite manner permitting the occupant to leave the vehicle unobstructed.

21 Claims, 13 Drawing Figures

AUTOMATIC SAFETY BELT APPARATUS FOR RESTRAINING THE OCCUPANT SITTING ON THE SEAT OF A VEHICLE

The present invention relates to an automatic seat belt, and especially, to a vehicle occupant restraining safety strap apparatus or a safety seat belt apparatus for motor vehicles wherein an end portion of a safety seat belt connected with an automatic winding device is fixed to a first fixed supporting member which is secured to a position, to the rear of and on the door side of the seat. The intermediate portion of the belt is extended loosely through several fixed supporting members and movable supporting members, the movement of the movable supporting members being operatively associated with the closing of the door or after the door has been closed.

According to the present invention belt is fastened across the front side of the hip and across the shoulder of the occupant. When the door of a vehicle is closed, the safety belt automatically positions itself around the occupant as the shoulder and pelvic restraining strap, while when the door is opened the safety belt automatically disconnects the fitting thereof to allow the occupant enter or leave without obstruction. The safety belt can be automatically actuated independentally of the opening or closing of the door, or manually detached by the user in case of emergency.

Since conventional safety seat belts for vehicles have been manually employed by the actions of the passengers, there still remains the possibility that human casualities as a result of collisions cannot be effectively prevented because of the insufficient use of the seat belt. Since conventional belts are not automatically actuated, the securing of the hip and the shoulders has not been operated automatically.

In the present invention, a belt is automatically operated by moving the movable supporting members containing the belt extended therethrough, said supporting members being connected to an automatic winding device. After the passenger has taken his seat, the movement of the movable supporting members is automatically commenced through the operations associated with the opening and closing of the door independent of any action taken by the user.

An object of the present invention is to avoid disadvantages existing in a prior art vehicle safety belt apparatus. Another object of the present invention is to provide an apparatus for automatically operating a safety belt so as to fasten a passenger in the vehicle seat.

A further object of the present invention is to provide a safety belt, which is made of one strap for restraining not only the waist, but also shoulder of a vehicle occupant, wherein the length of the belt is automatically adjusted to the size of the occupant. The belt is automatically operated by the use of an automatic winding means which automatically adjusts the belt for any vehicle occupant, irrespective of size. The safety belt apparatus is also provided with fixed supporting members which are respectively reinforced and, thus, are effective to prevent the automatic winding means from being directly affected by the pulling force of the belt in an emergency.

It is a still further object of the present invention to provide a safety belt apparatus which may be conveniently made in various sizes, which is simple, compact and light-weight in design, which is durable, which is reasonable in manufacturing cost, and which is capable of performing its intended function in an entirely, automatically, satisfactory and trouble-free manner.

It is a still further object of the present invention to provide a safety belt apparatus which is effective to satisfy the requirements is Nos. 208 and 209 of the Motor Vehicle Safety Standards stipulated by the National Highway Traffic Safety Bureau of the U.S.A..

These and other objects and features of the present invention will become apparent from the following full description of the present invention taken in conjunction with preferred embodiments thereof with reference to the accompanying drawings, in which.

Figure 1:
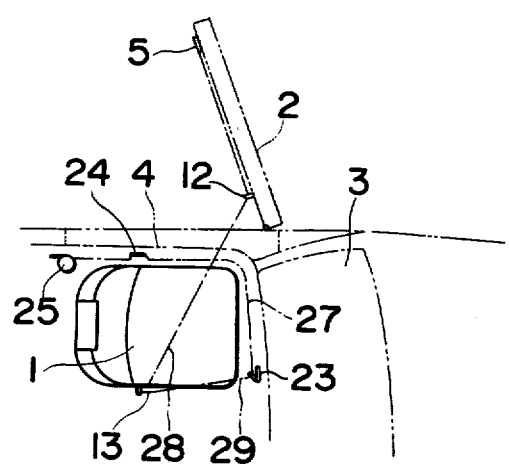
FIG. 1 is a schematic plan view showing the outlines of a safety belt applied to the front seat of a motor vehicle in one embodiment of the present invention.

Before we proceed with the description of the present invention, it is to be noted that like parts are designated by like reference numerals throughout the several views of the accompanying drawings. In addition, it is to be noted that an apparatus constructed in accordance with the present invention is adapted for use in conjunction with any vehicle having a body, door, floor, window, seat and the like. However, for the sake of brevity, the description of the vehicle structure is herein omitted, since such vehicle structures are well known in the art.

Referring now to FIGS. 1 through 6, a safety belt apparatus embodying the present invention is applied to the front seat of the vehicle. Considering the invention broadly, the safety belt apparatus comprises a flexible strong belt, which is made of one strap or web, for restraining not only the hip, but also the shoulder of the occupant sitting on the seat, three sets of fixed supporting means for securing both ends and middle portions of the belt, two sets of movable supporting means for shiftably holding the intermediate portions of the belt between each pair of the fixed supporting means and at least one automatic winding means for forcibly winding up the belt.

Figure 2:
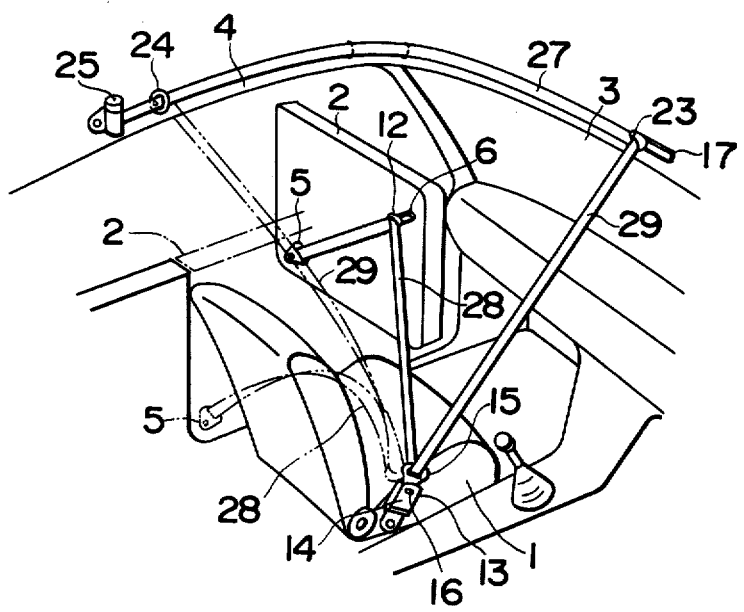
FIG. 2 is a schematic perspective view of FIG. 1, taken from the inside of the motor vehicle, showing the details thereof on an enlarged scale.

In FIGS. 1 and 2, reference numerals 1, 2, 3 and 4 represent, respectively, a front seat provided within a vehicle body, a front door rotatable to either the open or closed position with respect to a doorway of the vehicle body, a front window, and a roof of the body which is connected with upper portions of pillars of the body. A safety belt 27 of one strap having the same width throughout the length thereof is divided provisionally into two parts, one portion 28 which is adapted for restraining the hip of the occupant sitting on the seat 1 while the other portion 29 is employed for holding the shoulder of the occupant. A first fixed supporting means 5 is provided adjacent to one end of the belt portion 28 for securing the end of the belt to the door 2 while, adjacent to a free end of the belt portion 29, an automatic winding means 25 is provided forcibly winding up the belt. The automatic winding means is secured on the roof 4. At a middle portion of the belt, that is, the connecting portion which divides the belt 27 into parts 28 and 29, is provided with a second fixed supporting means 13 for securing that portion of the belt to the floor of the body. A third fixed supporting means 24 is provided in the close proximity of the automatic winding means 25 for securing the end portion of the belt to the roof 4, the belt being passed freely through the second and third fixed supporting means so that its position is shiftable or secured by the fixed supporting means.

A first movable supporting means 12 is provided at an intermediate portion between the first and second fixed supporting means for holding that portion of the belt on the door so as to permit that portion of the belt to shift from one location as shown in FIG. 2 to another location in accordance with the selective opening and closing of the door. Said latter location is provided close to the first fixed supporting means. A second movable supporting means 23 is provided at an intermediate portion between the second and third fixed supporting means for holding that portion of the belt on the roof, so as to permit said portion of the belt to shift from one location as shown in FIG. 2 to another location in accordance with the selective opening and closing of the door. Said latter location is provided close to the third fixed supporting means 24.

Figure 3:
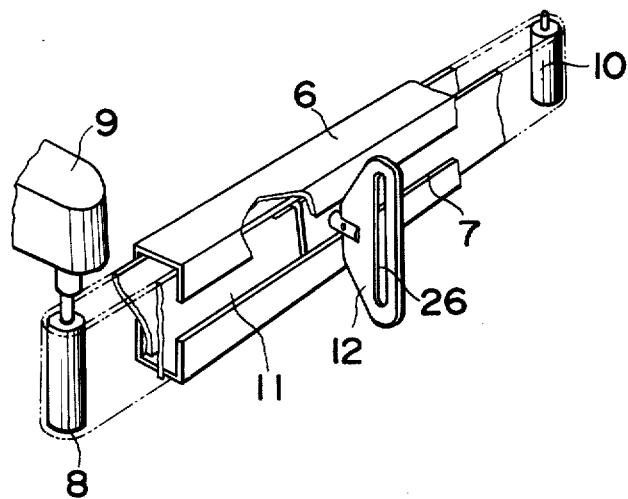
FIG. 3 is an enlarged perspective view, partially in section, showing the structure of the guide rail employed in the apparatus of FIG. 2.
Figure 4:
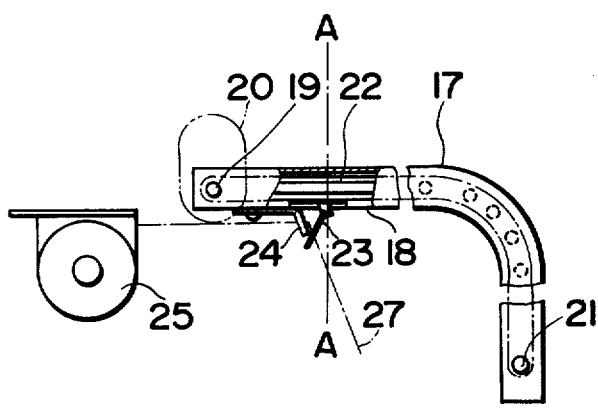
FIG. 4 is a schematic plan view, partially in section, showing the structure of another guide rail employed in the apparatus of FIG. 2.
Figure 5:
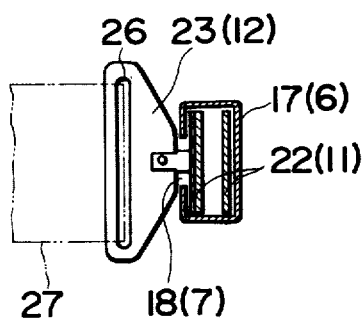
FIG. 5 is a sectional view taken along the line A—A in FIG. 4.

The first fixed supporting member 5 is secured to the door 2, that is, to an inner side portion of the door and is disposed to the rear of the back portion of the seat when the door is closed. A guide rail 6 made of a substantially C-shaped channel is secured to the inner side portion of the door 2 extending upwardly from a position adjacent to the first fixed supporting member 5 to an upper portion of the door. As shown in FIG. 3, the guide rail 6 is provided with a drive roller 8 and an idle roller 10 at the both ends thereof, the drive roller 8 being connected with a small motor 9 which is rotatable in both directions. An endless belt 11 is disposed on rollers 8 and 10 within the guide rail 6. The first movable supporting member 12 is fixedly secured to the belt 11 and projects outwardly from a clearance 7 of the guide rail 6. In the arrangement so far described, when the door 2 has been opened, the movable supporting member 12 is moved to the forward upper end of the guide rail 6 together with the belt 11 by the the small motor 9 rotating in one direction. When the door has been closed, the movable member 12 is moved to the backward lower end thereof adjacent to the first fixed supporting member 5 by then rotating in the opposite direction the motor 9. The second fixed supporting member 13 is fixed to a lower and rear portion of the seat 1 on one side remote from the door and substantially opposite to the position of the first fixed supporting member 5 when the door is closed. The second fixed supporting means 13 comprises, for example, a bayonet buckle 14 which corresponds to a buckle of a seat belt which is normally used. Said buckle may comprise a fixed socket which is fixedly secured to the chassis construction members including, for example, the seat and floor. The second fixed supporting member 13 further comprises a tongue plate 15 which is detachably inserted into the bayonet buckle 14. The tongue plate 15 can be released from the engagement with the buckle 14 by operating a push-button 16 on the bayonet buckle 14 in case of an emergency. A guide rail 17 made of a substantially C-shaped channel is fixedly extended in the form of a substantially L-shaped curve bent at an angle of approximately 90° as shown in FIGS. 2 and 4. The guide rail 17 is disposed along the roof portion 4 between the front position above the second fixed supporting member 13 and the side position, above the first fixed supporting member 5 when the door 2 is closed. A drive roller 19 and an idle roller 21 are provided at both end portions thereof in a similar manner as described in connection with the guide rail 6. The drive roller 19 is connected with a small motor 20 which is rotatable in both directions rotation, an endless belt 22 being disposed on the rollers 19 and 21 within the guide rail 17. The second movable supporting member 23 is fixedly provided on the belt 22 and projecting outwardly from a clearance 18 of the guide rail 17. The arrangement operates in such a manner that, when the door 2 has been opened, the supporting member 23 together with the belt 22 is moved to the end thereof corresponding to the front position above the second fixed supporting member 13 by the the small motor 20 rotating in one direction and, when the door has been closed, the supporting member 23 together with the belt is moved by the motor 20 then rotating in the opposite direction to the end thereof corresponding to the side position above said first fixed supporting member 5. The third fixed supporting member 24 is fixed to the end portion of the guiding rail 17 corresponding to a position substantially above the first fixed supporting member 5. The supporting member 24 is a reinforced member for securing the seat belt on the roof 4. The automatic winding means 25 for forcibly winding up the belt is secured at a suitable location on the roof 4 behind the supporting member 24. Slits 26, as shown in FIGS. 3 and 5 are respectively provided in the second and third fixed supporting members 15 and 24 and also in the first and second movable supporting members 12 and 23. The seat belt is loosely inserted through the slits 26. Rollers for facilitating the rotation of the seat belt may be advantageously provided in the slits 26 of the above supporting members.

Figure 6:
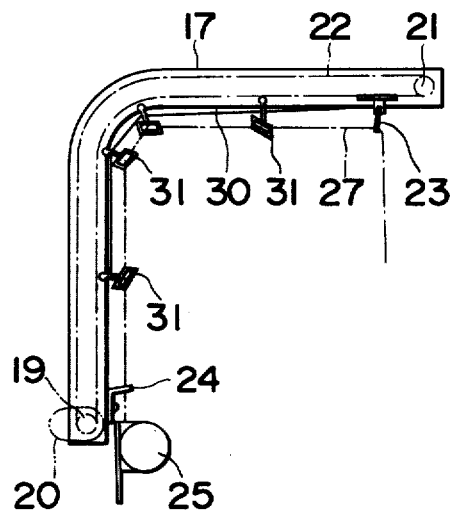
FIG. 6 is a schematic plan view of a modification of FIG. 4.

The belt 27 which, for example, may be made of nylon, is connected with the automatic winding means 25 at its one end. The end of the belt is fixed to the first supporting member 5 and is loosely extended through each slit 26 of the first movable supporting member 12, the second fixed supporting member 13, the second movable supporting member 23 and the third fixed supporting member 24. Finally, the belt is connected at the other end with the automatic winding means 25, whereby the shoulder and pelvic restraint is accomplished. Since the guide rail 17 is curved at an angle of approximately 90°, the belt tends to extend obliquely away from the guide rail 17 between the second movable supporting member 23 and the third fixed supporting member 24. To prevent this drawback, a plurality of auxiliary movable supporting members 31 connected with the second movable supporting member 23 by means of connecting means, e.g., a string 30 are movably secured on the guide rail 17, as shown in FIG. 6. The belt 27 is adapted to move along the curved line of the guide rail 17 through slits provided in the auxiliary movable supporting members 31.

In this embodiment, the rotation of each of the small motors 9 and 20 in said one direction is automatically effected at the same time by means of a switch operable in response to the opening of the door 2, or by means of a switch or the like operatively associated with the opening of the door 2. The rotation thereof in said opposite direction is automatically effected at the same time by means of another limit switch which is operatively associated with the closing of the door 2. The two switches, respectively, may be designed to operate by depressing buttons or the like provided in positions accessible to the driver. Also, it is preferable to insert a main switch into both motor circuits, respectively associated with said motor 9 and 20, in which case the main switch may be actuated only after the door has been brought into the closed position, or the users have taken their seats. These limit switches, although not shown in the drawings can be respectively fixed at both ends of the guide rails 6 and 17 to detect a movement of the first movable support member 12 and the second movable support member 23 so as to stop the operation of the small motors 9 and 20.

While the seat belt apparatus of the present invention is constructed as hereinbefore fully described, the operation thereof will now be described.

Assuming that a passenger desired to get on a vehicle, opening of the door 2 causes the small motors 9 and 20 to rotate in the one direction so as to move the first movable supporting member 12 and the second movable supporting member 23 to a position indicated by a solid line in FIG. 2 whereby the user can easily take his seat merely by putting his knees below the travelling section 28 of the belt 27 between the first movable supporting member 12 and the second fixed supporting member 13. Closing of the door 2 under this condition causes the small motors 9 and 20 to rotate in the opposite direction so as to move the first movable supporting member 12 to the first fixed supporting member 5 by the movement of the belt 11 within the guide rail 6, and the second movable supporting member 23 to the third fixed supporting member 24 by the movement of the belt 27 within the guide rail 17. Accordingly, the travelling section 28 of the belt 27 between the first fixed supporting member 5 and the second fixed member 13 fastens the front and both sides of the hip of the occupant sitting on the seat. This is achieved because the surplus length of the belt 27 is wound up by the automatic winding means 25. At the same time, that portion of the belt 29 between the second fixed supporting member 13 and the third fixed supporting member 24 diagonally extends over the soulder of the occupant, that is, from one side of the hip to the other side of the shoulder, thereby fastening the latter. Here again, this is achieved because the surplus length of the belt 27 is wound up by the automatic winding means 25. Thus, fastening of the waist and shoulder of the occupant by means of the belt is automatically performed, independently of the user's intention, by adjusting the length of the seat belt as hereinbefore described. As the automatic winding means 25 is used to freely adjust the belt length under normal conditions, the belt is automatically drawn out, for example, if the user bends the upper half of his body forward and the belt is automatically pulled in, if the user bends the upper half of his body backward. When the abnormal acceleration has been applied upon the vehicle, for example, by collision, the automatic winding means detects the collision and locks the belt, for example, by means of a gravity senser whereby the length of the belt 27 is immediately fixed as in the well known in the art. Thus, the user can avoid the forward movement caused by the inertia movement due to the collision, or the counteraction thereof or the like, so that injury can be avoided. The locking unit of the automatic winding means is well-known in the art. As the second supporting member 13 can be manually released from the bayonet buckle 14, the passenger can easily escape the seat in case of emergency. The operation thereof is, in principle, similar to that afforded by the emergency detaching means for the conventional seat belt.

Although the belt apparatus of the present invention is applied to the front seat of the vehicle as shown in FIGS. 1 through 6, it may be employed in the rear seat of the vehicle. This will be described hereinafter.

Figure 7:
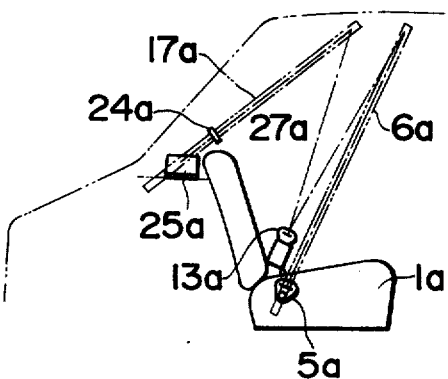
FIG. 7 is a schematic side view showing the outline of a safety belt applied to the rear seat of a motor vehicle, in another embodiment of the present invention.
Figure 8:
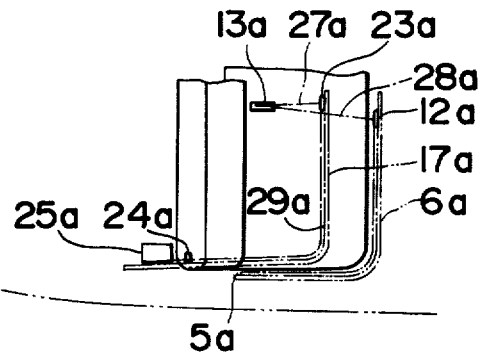
FIG. 8 is a schematic plan view of a portion of FIG. 7.
Figure 9:
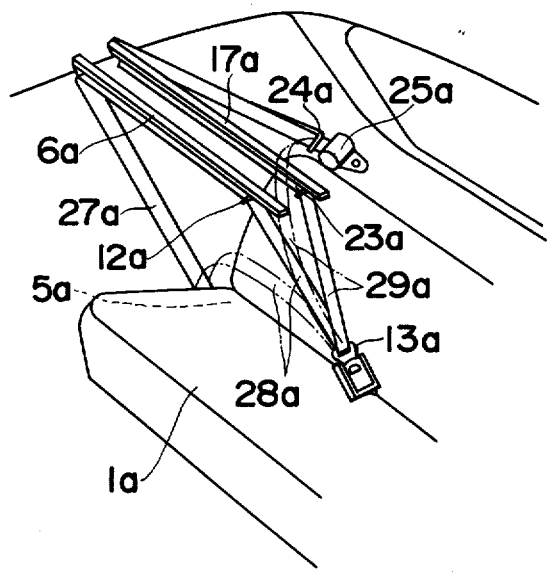
FIG. 9 is a schematic perspective view of FIG. 8, taken from the inside of the motor vehicle, showing the details thereof on an enlarged scale, and FIG. 10, (a) to (d), shows schematic diagrams of exemplary safety belt arrangements according to the present invention.
Figure 10A:
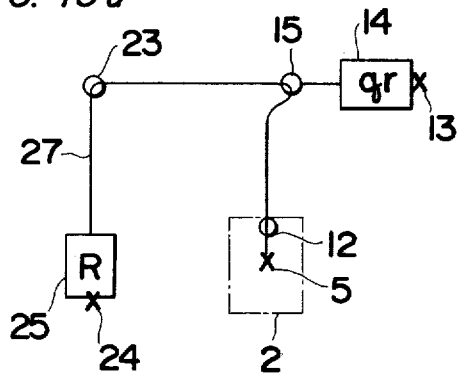
Figure 10B:
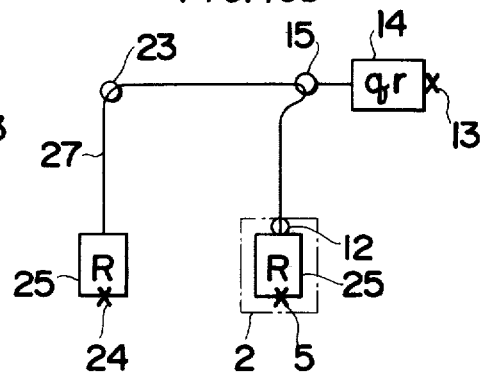
Figure 10C:
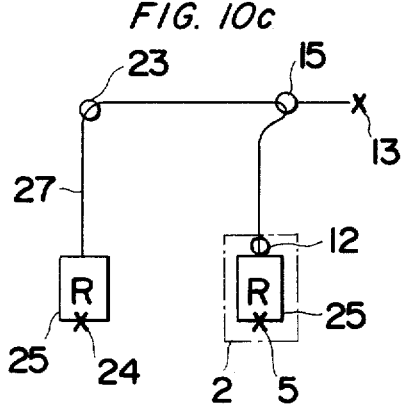
Figure 10D:
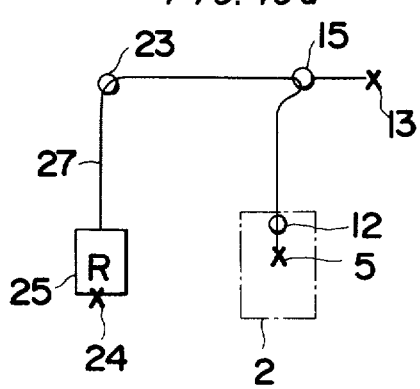

FIGS. 7 through 9, respectively, show a rear seat with the present invention provided thereon. In this embodiment, the first movable supporting member 12a is adpated to move along the guide rail 6a between the first and second supporting members 5a and 13a. The second movable supporting member 23a is adapted to move along the guide rail 17a between the second and third fixed supporting members 13a and 24a.

The automatic winding means 25a and the belt 27a are respectively provided with the same arrangement as described in the foregoing embodiment. The first fixed supporting member 5a in this embodiment is fixed on the door near the side of the seat and backwardly of the rear portion of the seat 1a, as shown in FIG. 9. The second fixed supporting member 13a is secured at a substantially intermediate portion of the seat and between the cushion and the back thereof. The second fixed supporting member 13a has the same emergency detaching means as employed in the foregoing embodiment. The third fixed supporting member 24a and the automatic winding means 25a are respectively fixed above the back portion of the seat 1a, on the door side. In connection with the guide rail 6a, the drive roller, the idle roller, the reversible small motor, and the belt are of the same construction as employed in the foregoing embodiment. The movable supporting member 12a carries the belt loosely extending therethrough. The guide rail 6a for guiding the movement of the first movable supporting member 12a extends in a substantially L-shape configuration from the position above the second fixed supporting member 13a to the first fixed supporting member 5a. The guide rail 17a having the same construction as the guide rail 6a for guiding the movement of the second movable supporting member 23a also extends in a substantially L-shape configuration between the point above the second fixed supporting member 13a and the third fixed supporting member 24a. Each of the guide rails 6a and 17a may be fixed to the roof of the vehicle.

The tightening and loosening of the seat belt in this embodiment are selectively achieved in substantially the same manner as in the foregoing embodiment. However, as the position of installing the guide rail 6a locates within the roof of the vehilce, the difference therebetween is that the sliding movement of the first movable supporting member 12a or the tightening of the belt is normally controlled within the vehicle either by the occupant or automatically in response to pressure applied by the occupant to the seat. Therefore, the operation of the seat belt in this embodiment is not operatively associated with the opening and closing of the door.

In another embodiment of the present invention the automatic winding means may be provided on the first fixed s supporting member 5 as shown in FIGS. 10 (b) and (c) and the tongue plate 15 may be fixed to the vehicle body without the bayonet buckle 14 as shown in FIGS. 10 (c) and (d).

From the foregoing description, it will be clearly understood that the present invention provides a highly reliable automatic seat belt wherein the belt wound up into the automatic winding means is extended through a plurality of fixed supporting members and movable supporting members provided along the door, the seat, and the roof. One end of the belt is secured to the first supporting member on the door side and the belt is automatically fixed around the waist and across the shoulder of the user by closing the door which controls the movement of the movable supporting members. The belt is automatically released by opening the door which controls the movement of the movable supporting members in the opposite direction. The belt can be disconnected by the user without the use of the movable supporting members. The movement of the movable supporting members is operatively associated with the opening and closing of the door and, as such, automatically tightens or loosens the belt in response to closing or opening of the door.

Also, it will be clearly understood that the seat belt apparatus, particularly with respect to the rear seat, including a plurality of fixed supporting members, movable supporting members and the automatic winding means, is provided around the seat of the vehicle. The automatic tightening and releasing of the seat belt is performed by controlling the movement of the movable supporting members, independently of the opening and closing of the door.

In view of the fact that various changes and modifications of the present invention are apparent to those skilled within the art, they should be construed as included in the scope of the present invention unless otherwise departing from the true spirit and scope of the present invention.

What is claimed is:

1. An automatic safety belt apparatus for restraining the occupant sitting on a seat within a vehicle body having at least one door hingedly supported by the vehicle body for selectively opening and closing the doorway from the outside of the vehicle body toward the seat, which comprises;
   a. a flexible belt of suitable width having first and second ends, said first end of said belt being connected with the door,
   b. automatic winding means rigidly connected with said second end of said belt for forcibly winding up said belt thereby holding said belt under tension,
   c. stationary holding means comprising a holding member for holding a first substantially intermediate portion of said belt, and a buckle detachably engageable with said holding member and rigidly connected with a portion of the vehicle body, thereby permitting a first length of said belt between said first end and said first substantially intermediate portion of said belt to extend over the hip portion of the occupant for restraining the same when the occupant is sitting on the seat within the vehicle body with the door closed,
   d. movable holding means for holding a second substantially intermediate portion of said belt between said stationary holding means and said second end thereby providing a second length of said belt adaptable for restraining the shoulder portion of the occupant on the seat, said movable holding means being movable between releasing and fastening positions, said releasing position being located substantially obliquely, upwardly and forward of the occupant on the seat and said fastening position being substantially above the door and obliquely, upwardly, behind the occupant on the seat,
   e. motor means for effectuating the movement of said movable holding means between said releasing and fastening positions whereby, when said movable holding means is in said releasing position, said second length of said belt extends substantially obliquely, upwardly from said stationary holding means on one side of the hip portion of the occupant remote from the door and forwardly of the occupant and, when said movable holding means is in said fastening position, said second length of said belt extends obliquely from said stationary holding means across the chest portion and over the shoulder portion of the occupant on the other side of said occupant to fasten said chest portion and said shoulder portion, and
   f. guide means fixedly extending substantially above the occupant on the seat for guiding the movement of said movable holding means and providing said releasing and fastening positions for said movable holding means.

2. An apparatus as claimed in claim 1, wherein said first end of said belt is connected with the door at a position corresponding to one side of the hip portion of the occupant sitting on the seat and wherein said stationary holding means is connected with a portion of the vehicle body at a position corresponding to the other side of the hip portion of the occupant on the seat.

3. An apparatus as claimed in claim 1, wherein said motor means is operable in response to the selective opening and closing of the door in such a way as to move said movable holding means to said fastening position, when the door is closed, thereby to automatically bring the belt into operative condition to fasten the occupant on the seat in the specified manner, and to move said movable holding means to said releasing position, when the door is opened, thereby to automatically bring the belt into inoperative condition to loosen the occupant on the seat.

4. An apparatus as claimed in claim 1, wherein said automatic winding means is capable of locking said belt in operative condition to fasten the occupant on the seat in the specified manner when the vehicle meets an emergency situation with an excessively high external force sensed thereby.

5. An apparatus as claimed in claim 1, wherein the holding member is provided with a slot through which said first substantially intermediate portion of said belt loosely extends, said buckle being rigidly connected with a portion of the vehicle body at a position substantially corresponding to one side of the hip portion of the occupant on the seat without disturbing the movement of the belt through said slot, said first end of said belt being connected with the door at a position substantially corresponding to the other side of the hip portion of the occupant on the seat.

6. An apparatus as claimed in claim 1, further comprising connecting means disposed on the door adjacent to said first end of said belt and including;
- a movable holder having a slot through which a portion of said belt adjacent to said first end loosely extends;
- a guide rail of substantially a C-shaped channel having a clearance along which said movable holder is guided, said guide rail being rigidly secured to said door;
- another motor means for effectuating movement of said movable holder between first and second positions respectively adjacent to the both ends of said guide rail, said first position being located adjacent to the other side of the hip portion of the occupant on the seat, said movable holder being moved to said second position when the door is opened thereby permitting said first length of said belt to extend across the front of the occupant without obstructing the doorway and without substantially disturbing the sitting and leaving of the occupant with respect to the seat and, when the door is closed with the occupant sitting on the seat, said movable holder being moved to said first position.

7. An apparatus as claimed in claim 6, wherein said another motor means is operatively associated with the first mentioned motor means in such a way as to move said movable holder to said first position, when the door is closed, and to move said movable holder to said second position when said door is opened.

8. An apparatus as claimed in claim 6, wherein said another motor means is of the same type as the first mentioned motor means.

9. An apparatus as claimed in claim 6, wherein said guide rail is straight and has one end situated on the door at a position corresponding to the side of the hip portion of the occupant and the other end situated on the door at a position adjacent to the hinged edge of the door, said guide rail extending substantially obliquely and upwardly from said first position to said second position.

10. An apparatus as claimed in claim 6, further including another automatic winding means, said first end of said belt being rigidly connected with the door through said another automatic winding means.

11. An apparatus as claimed in claim 6, wherein said guide means comprises a guide rail of substantially a C-shaped channel having a clearance along which said movable holding means is guided between said fastening and releasing position and wherein said motor means comprises a reversible motor, a drive roller rotatable by said motor in first and second directions about the axis of said drive roller and an idle roller, both of said rollers being respectively rotatably carried by said guide rail at both ends of said guide rail, and an endless belt movably suspended around both of said rollers, said movable holding means being carried by said endless belt whereby, when said drive roller is rotated in one direction, said movable holding means moves from said releasing position to said fastening position thereby causing the belt to fasten the occupant on the seat in the specified manner and, when said drive roller is rotated in the opposite direction, said movable holding means moves from said fastening position to said releasing position thereby causing the belt to release the occupant.

12. An apparatus as claimed in claim 11, wherein said guide rail is curved to represent a substantially L-shaped configuration having first and second sections, said first section of said rail being secured to a portion of the vehicle body at a position upwardly and forwardly of the occupant on the seat while said second section is secured to another portion of the vehicle body, substantially above and along an upper edge of the door, and further comprising at least one fixed holder having a slot through which said belt loosely extends, said fixed holder being rigidly secured to said guide rail at an end portion of said guide rail adjacent to said fastening position of said movable holding means.

13. An apparatus as claimed in claim 11, wherein said motor is operable in response to the selective opening and closing of the door in such a way as to cause said drive roller to rotate in said one direction when the door is closed and in said opposite direction when the door is opened.

14. An automatic safety belt apparatus for restraining the occupant sitting on a seat within a vehicle body having at least one door hingedly supported by the vehicle body for selectively opening and closing the doorway from the outside of the vehicle body towards the seat, which comprises;
- a. a flexible belt of suitable width having first and second ends,
- b. first automatic winding means rigidly connected with said first end of said belt which is in turn attached to said vehicle door,
- c. second automatic winding means rigidly connected with said second end of said belt which is in turn attached to the vehicle roof, said first and second automatic winding means being in cooperative relation for forcibly winding up said belt thereby to hold said belt under tension,
- d. first movable holding means for holding a portion of said belt adjacent to said first end thereof, said first movable holding means being movable between first and second positions,
- e. stationary holding means comprising a holding member for holding a first substantially intermediate portion of said belt, and a buckle detachably engageable with said holding member and rigidly connected with a portion of the vehicle body, thereby permitting a first length of said belt between said first movable holding means and said stationary holding means to extend over the hip portion of the occupant sitting on the seat for restraining the hip portion when said first movable holding means is in said first position while the door is closed, said first length of said belt extending clear of the hip portion of the occupant when said first movable holding means is in said second position while the door is opened, without obstructing the doorway and without disturbing the sitting and leaving of the occupant with respect to the seat,
- f. first guide means secured to the door for guiding the movement of said first movable holding means between said first and second positions, g. first motor means for effectuating the movement of said first movable holding means between said first and second positions, h. second movable holding means for holding a second substantially intermediate portion of said belt between said stationary holding means and said second movable holding means thereby providing a second length of said belt adaptable for restraining the shoulder portion of the occupant on the seat, said second movable holding means being movable between releasing and fastening positions, said releasing position being located substantially obliquely upwardly and forward of the occupant on the seat and said fastening position being located substantially above the door and obliquely, upwardly behind the occupant on the seat, i. second guide means fixedly extending substantially above the occupant on the seat for guiding the movement of said second movable holding means and providing said releasing and fastening positions for said second movable holding means, j. second motor means for effectuating the movement of said second movable holding means between said releasing and fastening positions whereby, when said second movable holding means is in said releasing position, said second length of said belt extends substantially obliquely, upwardly from said stationary holding means on one side of the hip portion of the occupant remote from the door and forwardly of the occupant and, when said second movable holding means is in said fastening position, said second length of said belt extends obliquely from said stationary holding means across the chest portion and over the sholder portion of the occupant on the other side of said occupant to fasten said chest portion and said shoulder portion.

15. An apparatus as claimed in claim 14, wherein each of said first and second automatic winding means is capable of locking said belt in operative condition to fasten the occupant on the seat in the specified manner when the vehicle meets an emergency situation with an excessively high external force sensed thereby.

16. An apparatus as claimed in claim 14, wherein the holding member is provided with a slot through which said first substantially intermediate portion of said belt loosely extends, said buckle being rigidly connected with a portion of the vehicle body at a position substantially corresponding to the side of the hip portion of the occupant on the seat without distrubing the movement of the belt through said slot, said first automatic winding means being secured to the door at a position substantially corresponding to the other side of the hip portion of the occupant on the seat.

17. An apparatus as claimed in claim 14, wherein said first automatic winding means is secured to the door at a position substantially corresponding to the other side of the hip portion of the occupant on the seat.

18. An apparatus as claimed in claim 14, wherein said first guide means comprises a guide rail of substantially a C-shaped channel having a clearance along which said first movable holding means is guided between said first and second positions, said guide rail being rigidly secured to the door and having one end situated adjacent to said first automatic winding means and at a position substantially corresponding to the other side of the hip portion of the occupant on the seat and the other end situated at a position adjacent to the hinged edge of the door, said guide rail extending substantially obliquely and upwardly from said first position to said second position, and wherein said first motor means comprises a reversible motor, a drive roller rotatable by said motor in first and second directions about the axis of said drive roller and an idle roller, both of said rollers being respectively rotatably carried by said guide rail at both ends of said guide rail, and an endless belt movably suspended around both of said rollers, said first movable holding means being carried by said endless belt whereby, when said drive roller is rotated in said first direction, said first movable holding means moves to said first position thereby causing the belt to fasten the occupant on the seat in the specified manner and, when said drive roller is rotated in said second direction counter to said first direction, said first movable holding means moves to said second position thereby causing the belt to release the occupant.

19. An apparatus as claimed in claim 14, wherein said second guide means comprises a guide rail of substantially a C-shaped channel having a clearance along which said second movable holding means is guided between said fastening and releasing positions, said guide rail being curved to represent a substantially L-shaped configuration having first and second sections, said first section of said rail being secured to a portion of the vehicle body at a position upwardly and forward of the occupant on the seat while said second section is secured to another portion of the vehicle body, substantially above and along an upper edge of the door, and wherein said second motor means comprises a reversible motor, a drive roller rotatable by said motor in first and second directions about the axis of said drive roller and an idle roller, both of said rollers being respectively rotatably carried by said guide rail at both ends of said guide rail, and an endless belt movably suspended around both of said rollers, said second movable holding means being carried by said endless belt, whereby, when said drive roller is rotated in the first direction, said second movable holding means moves from said releasing position to said fastening position thereby causing the belt to fasten the occupant on the seat in the specified manner and, when said drive roller is rotated in said second direction counter to said first direction, said movable holding means moves from said fastening position to said releasing position thereby causing the belt to release the occupant.

20. An apparatus as claimed in claim 14, wherein said first and second motor means are both operable in response to the selective opening and closing of the door and in synchronism with respect to each other in such a way as to move said first and second movable holding means to said first and fastening positions, when the door is closed, thereby to automatically bring the belt into operative condition to fasten the occupant on the seat in the specified manner and to move said first and second movable holding means to said second and releasing positions, when the door is opened, thereby to automatically bring the belt into inoperative condition to loosen the occupant on the seat, respectively.

21. An apparatus as claimed in claim 19, wherein said guide rail has one end situated adjacent to said second automatic winding means and rigidly provided with a fixed holder having a slot through which a portion of said belt, adjacent to the second end thereof, loosely extends.

* * * * *